United States Patent [19]

Franks, Jr.

[11] Patent Number: 4,828,504
[45] Date of Patent: May 9, 1989

[54] CLAMP

[76] Inventor: George J. Franks, Jr., 664 Thompson Cir., Inverness, Ill. 60067

[21] Appl. No.: 116,899

[22] Filed: Nov. 5, 1987

[51] Int. Cl.$^4$ .................................................. H01R 4/66
[52] U.S. Cl. ...................................... 439/92; 439/433; 439/803
[58] Field of Search ................... 439/92, 431, 433, 439, 439/803, 813

[56] References Cited

U.S. PATENT DOCUMENTS

| 2,420,895 | 5/1947 | Merriman | 439/803 |
| 2,632,068 | 3/1953 | Froebel et al. | 439/803 X |
| 3,363,219 | 1/1968 | Hubbard et al. | 439/803 X |
| 4,626,051 | 12/1986 | Franks | 439/813 X |

FOREIGN PATENT DOCUMENTS 1126748  11/1956  France .................... 439/433

Primary Examiner—Eugene F. Desmond
Attorney, Agent, or Firm—Jenner & Block

[57] ABSTRACT

A clamping device having a U-shaped portion between which material is positioned to be mechanically and electrically coupled to the clamp when engaged. One inner surface of the U-shaped clamp includes a conically-shaped tip of a hardened material which is positioned directly opposed to a threaded bolt or stud extending outwardly from the opposed inner surface of the U-shaped clamp for engagement with the conically-shaped tip. The terminal end of the oppositely positioned threaded bolt is formed with a complementary recess and, preferably, a knurled or serrated outer edge for abrading material which is engaged upon the tightening of the bolt. In one embodiment of the clamp, the threaded bolt includes a terminal portion adapted to accommodate and have secured therein a terminated ground wire, and the U-shaped clamp has an undercut portion for positioning against an upturned flange edge of a panel. In another embodiment, the U-shaped clamp does not have the undercut portion, nor a terminal portion adapted to receive a terminated ground wire. This latter embodiment is more suitable for positively securing two flat pieces of strap material, such as two copper bars, used in forming a terminated ground connection.

9 Claims, 1 Drawing Sheet

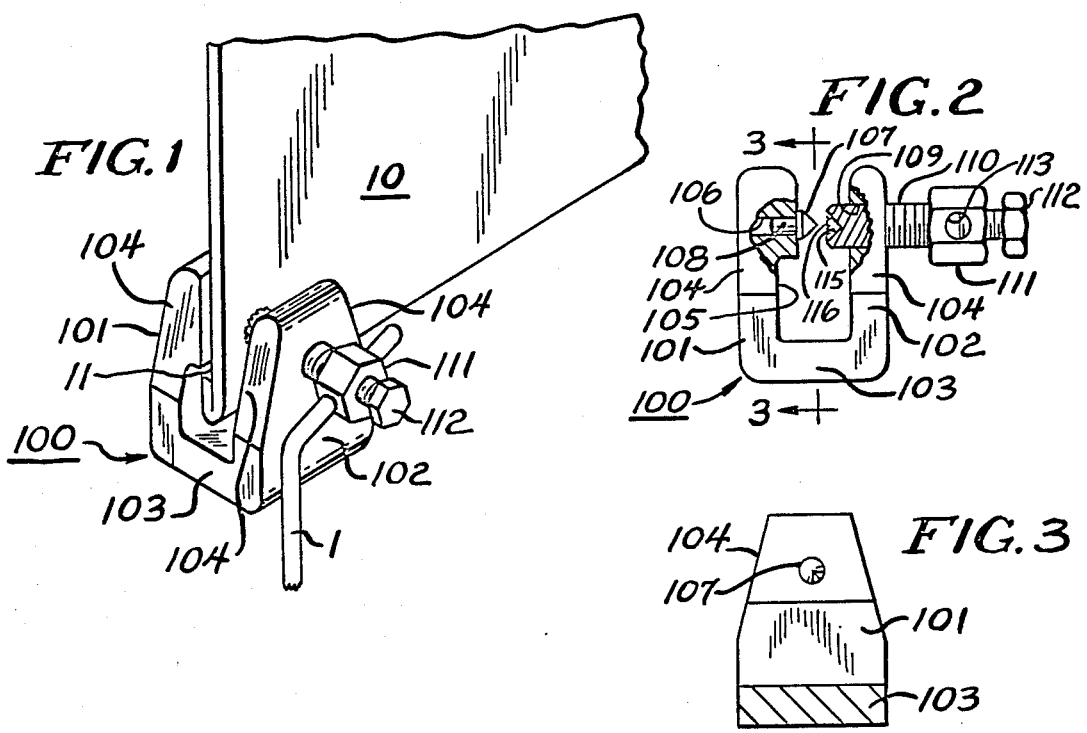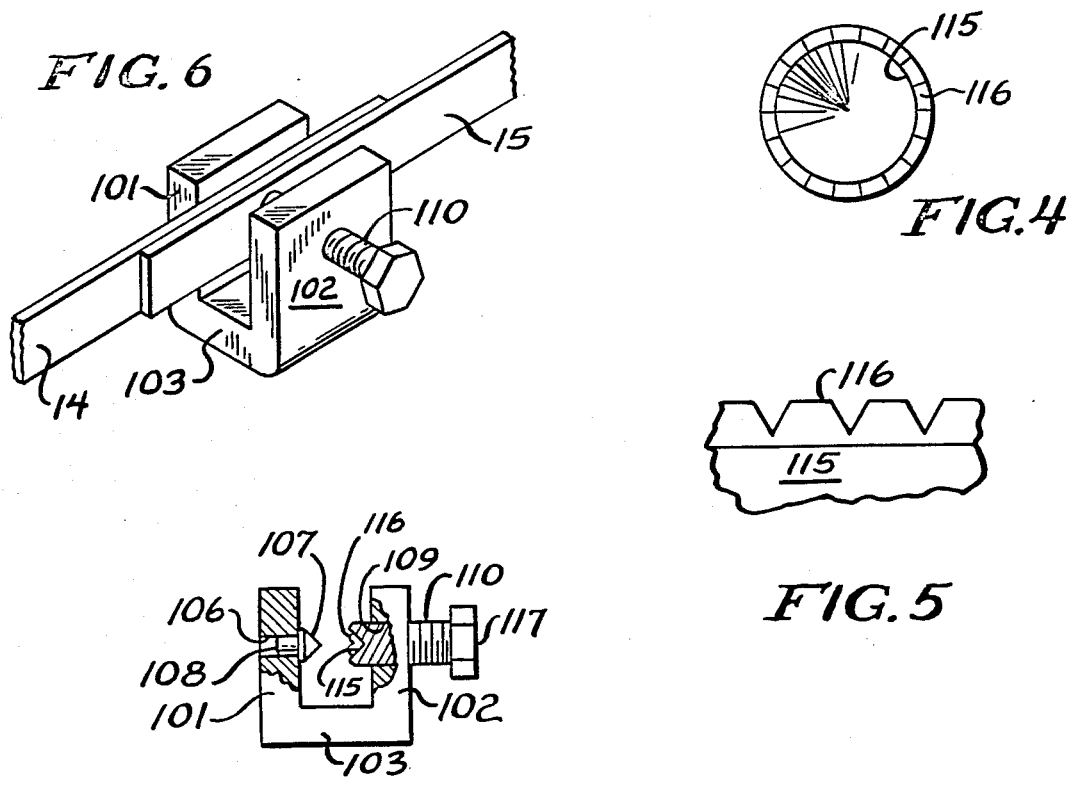

CLAMP

BACKGROUND OF THE INVENTION

This invention relates in general to clamping devices and, in particular, to a clamping device which in one embodiment is especially suitable for use as a pedestal clamp for grounding to buried residential meter boxes or a panel ground clamp, and in another embodiment is especially useful for joining or coupling two flat pieces or straps of material.

More specifically, but without restriction to the particular embodiments and/or use which are shown and described for purposes of illustration, this invention relates to a clamp having a U-shaped portion with one side of the U supporting a hardened pointed tip, and the opposing side of the U supporting a threaded bolt having a complementary cup-shaped recess for mechanically and electrically connecting the clamp to a flat panel or structure, or joining two flat pieces of strap material positioned therebetween.

As is known to those skilled in the art, various clamping devices have been utilized to provide an electrical ground or to join flat bar stock, such as copper bars used in various grounding devices. In applications wherein a pipe or conduit, for example, is to be grounded a grounding clamp such as disclosed in the inventor's U.S. Pat. No. 4,626,051 and co-pending application Ser. No. 94,268, filed Sept. 8, 1987, permit the grounding of various sized pipes or conduits without subjecting the clamping strap to false torques or damage which had been occasioned by prior art devices. While the clamps disclosed in the above-identified patent and pending application have been very successful in grounding pipes and conduits, such devices were not intended to be used for grounding panels or joining straps of grounding material.

In many applications, especially in residential housing construction, electrical service is provided through metered service. The meters by which the amount of service is determined are contained within a meter box, the base of which is many times partially buried in the ground. If a suitable grounding clamp could be utilized, the buried residential meter box can be used for coupling a terminated ground wire. The ground wire could then be fed through the conduit into the house for forming the necessary ground connection.

The problems, however, with utilizing a buried residential meter box for this purpose is that the part of the box to which a clamp would be most readily attachable is buried underground. Such boxes, also, are painted and/or treated with a coating to preserve them. Therefore, a grounding clamp must be capable of attachment in adverse conditions wherein dirt, paint, etc, must be removed at the point of attachment to ensure a suitable mechanical and electrical connection. If these problems can be overcome, the buried residential metal box becomes a suitable ground, eliminating the necessity heretofore required of sinking a grounding rod into the ground for forming such a ground connection.

In other applications, such as the installation of phone service to a mobile home, it is also desirable that the structure of the home be properly connected to ground by appropriately terminated ground wire. In connecting such a terminated ground wire to the home, the connection also must be done in a proper manner to ensure an effective electrical connection between the home and the terminated ground wire. In the construction of such homes, a metal frame and exterior is generally utilized. The metal frames generally are formed from channels or with flanges which are suitable for grounding purposes.

One embodiment of the present invention is especially suitable for mechanically and electrically connecting a terminated ground wire to buried residential meter boxes and mobile homes. The other embodiment of this invention is more suitable for mechanically and electrically connecting two flat pieces of strap material such as, for example, two copper bars which may be suitable for a terminated ground connection.

The clamps of the present invention are substantially U-shaped and have a pointed cone-shaped portion extending outwardly from one inner surface of the clamp towards the other, with a threaded bolt or stud having a complementary cup-shaped recessed portion in the end thereof extending outwardly from the opposed inner surface of the clamp. In this manner, when a piece of material is positioned within the bight of the U-shaped clamp, and the threaded bolt turned towards engagement with the oppositely positioned cone-shaped tip, the material therebetween will be engaged. Depending upon the relative hardness between the materials of the cone-shaped tip and the threaded bolt, and the material entrapped therebetween, the entrapped material will be mechanically worked by the two portions of the clamp to ensure a reliable mechanical and electrical coupling of the material sandwiched therebetween. Preferably, the material to be entrapped is less hard than the material from which the threaded bolt and cone tip are formed, so that upon tightening of the clamp, the cone tip will be forced into the material, deforming the material into the cup-shaped recess to ensure a proper connection. The edge of the cup-shaped portion will work or abrade against this material removing any dirt, paint, rust or coatings to ensure contact with the base metal.

SUMMARY OF THE INVENTION

It is, therefore, an object of this invention to improve clamps for connecting materials positioned between the clamp portions.

Another object of this invention is to mechanically and electrically secure a material engaged by the clamp with the clamp structure.

A further object of this invention is to create a mechanically deformation in the material to which the clamp is applied, for a more secure connection.

Still another object of this invention is to abrade the surface of the material to which the clamp is applied during the attaching process for ensuring a secure electrical connection.

These and other objects are attained in accordance with the present invention wherein there is provided a clamping device having a U-shaped portion between which material is positioned to be mechanically and electrically coupled to the clamp when engaged. One inner surface of the U-shaped clamp includes a conically-shaped tip of a hardened material which is positioned directly opposed to a threaded bolt or stud extending outwardly from the opposed inner surface of the U-shaped clamp for engagement with the conically-shaped tip. The terminal end of the oppositely positioned threaded bolt is formed with a complementary cup-shaped recess and, preferably, a knurled or serrated outer edge for abrading material which is engaged upon the tightening of the bolt. In one embodiment of the clamp, the threaded bolt includes a terminal portion adapted to accommodate and have secured therein a terminated ground wire, and the U-shaped clamp has an undercut portion for positioning against an upturned flange edge of a panel. In another embodiment, the U-shaped clamp does not have the undercut portion, nor a terminal portion adapted to receive a terminated ground wire. This latter embodiment is more suitable for positively securing two flat pieces of strap material, such as two copper bars, used in forming a terminated ground connection.

DESCRIPTION OF THE DRAWINGS

Further objects of the invention together with additional features contributing thereto and advantages accruing therefrom will be apparent from the following description of preferred embodiments of the invention which are shown in the accompanying drawings with like reference numerals indicating corresponding parts throughout, wherein:

FIG. 1 is a perspective view of the clamp applied to a panel for grounding the panel to a terminated ground wire;

FIG. 2 is a side planar view of the clamp illustrated in FIG. 1 with portions broken away to better illustrate the clamp structure;

FIG. 3 is a sectional view of the clamp illustrated in FIG. 2 taken along lines 3—3;

FIG. 4 is an enlarged view of the terminal end portion of the threaded bolt used in the clamping device;

FIG. 5 is an enlarged view of a portion of the knurling or cutting structure formed on the end of the threaded bolt;

FIG. 6 is a perspective of an alternative embodiment of the clamp used in joining two flat pieces of strap material; and FIG. 7 is a side planar view of the embodiment shown in FIG. 6 with portions broken away to better illustrate the construction thereof.

DESCRIPTION OF THE PREFERRED EMBODIMENTS

Referring now to FIG. 1, there is shown an embodiment of the clamp 100 secured to a panel 10 which forms a part of a structure to be grounded. The panel 10 could be a portion of a buried residential meter box, a frame member of a mobile home or any other metal surface to which the clamp 100 is to be attached. The clamp 100 has coupled thereto a terminated ground wire 1 for completing the grounding. As best illustrated in FIGS. 1-6, the clamp 100 is substantially U-shaped, and includes two upwardly extending portions 101 and 102 joined to a common base 103. Both of the sides 101 and 102 have tapered faces 104 in the preferred embodiment, but the sides of the upwardly extending portions could be parallel.

As best shown in FIGS. 2 and 3, side 101 of the clamp 100 is formed with an undercut portion 105 which aids in positioning the clamp onto the edge 11 of an upwardly turned flange of the panel 10. While such an undercut portion is preferable, it is to be understood that the side 101 could be formed with its inner face all in one plane. As best illustrated in FIG. 2, a bore or aperture 106 is formed through the side 101 of the clamp and has secured therein a conically-shaped hardened tip 107 preferably formed of heat treated beryllium copper or stainless steel, which includes a depending cylindrical portion 108 which is snug fit into the hole formed through the side 101.

The opposed side wall 102 of the clamp 100 has an opening formed therethrough with the center line thereof being coaxial with the center line of the hole formed in the opposed wall 101. The hole 109 formed in the side wall 102 is threaded and has received therein a threaded stud 110 preferably formed of heat treated beryllium copper or stainless steel with a hexagonally-shaped head 111 having a threaded internal bore coaxial with the longitudinal axis of the stud 110. This bore, not shown, is threaded to accommodate the external threads of a terminated ground wire securing screw 112 which functions to secure the terminated ground wire 1 to the stud 110.

The hexagonally-shaped head 111 is formed with a smooth bore 113 extending transversely of the longitudinal axis and passing completing through the stud head. In this manner, the terminated ground wire 1, preferably of AWG sizes 6 through 12, inclusive, and terminated in a manner known to those skilled in the art, is positioned through the smooth bore 113 and the securing screw 112 is tightened to fixedly secure the ground wire to the threaded stud 110.

The terminal or free end of the stud 110 is formed with a cone-shaped recess 115 which complements the cone-shaped tip 107 positioned opposed thereto. The edge portion of the stud, best illustrated in FIGS. 4 and 5, is preferably formed with a serrated surface 116, such as knurled, scored or cut, for a purpose to be hereinafter described. While it is preferable that the end of the stud 110 be so formed, depending on the hardness of the material to which the clamp is to be applied conventional machining techniques used in the fabrication of bolts may provide a sufficient abrading surface such that serrating, while preferable, is not necessary.

In operation, the clamp 100 is placed in a position substantially as illustrated in FIG. 1 with a panel 10 extending between the two legs 101 and 102 of the clamp. The threaded stud 110 is turned by means of the hexagonally-shaped head 111 causing the material 10 to which the clamp 100 is to be attached to be trapped between the cone-shaped tip 107 and the terminal end or face of the bolt. As the bolt or stud continues to be tightened, because the stud is centered directly over the grounding point of the cone-shaped tip 107, the maximum force is applied during tightening.

Preferably, the stud is fine threaded to permit a greater amount of rotational or turning motion against the material or panel 10 entrapped between the legs of the clamp. As the stud 110 is turned against the material 10 to be clamped, the abrading surface 116 on the face of the stud cleans the panel surface by mechanically scraping any paint or oxides from the surface of the material, providing intimate electrical contact. The cone-shaped point 107 will also penetrate the material to provide both a better electrical connection and a more intimate mechanical securing of the clamp onto the panel positioned therebetween. The penetration of the conically-shaped point 107 into the material 10 trapped thereinbetween, forces the material 10 into the recess 115 formed in the face of the stud 110 enhancing and stabilizing the mechanical connection of the clamp to the panel.

The recess 115 formed in the face of the threaded stud also functions to retain the loose material mechanically worked or scraped from the face of the panel or material 10 to minimize contamination which might occur from the mechanical abrasion of the panel. Since the clamp 100 is U-shaped, the tightening of the threaded stud 110 in this manner provides a positive pressure at the grounding point because of a spring-like action created by the tightening of the stud 110 against the point 107 which applies an outwardly directed force against the U-shape. This force is countered by the resiliency of the material from which the clamp is formed resulting in a biasing force to hold the clamp and panel. When the clamp has been so secured, the terminated grounding wire 1 is positioned within the smooth bore 113 and the terminated ground wire terminating screw 112 tightened to complete the installation.

Referring to the second embodiment of the invention, this embodiment is essentially the same as that previously described. Like reference numerals indicate corresponding parts to that of the previously described embodiment. In this embodiment, the threaded stud 110 has a conventional hexagaonlly-shaped head 117' which does not include a terminated ground wire terminating screw, as this embodiment is utilized to secure or join two flat pieces or straps 14 and 15. The clamp, however, is otherwise the same as that described with reference to the first embodiment. In this embodiment, however, it is preferable that the opposing inner faces of the clamp are parallel, and the face of the clamp in which the cone-shaped point 107 is secured is not stepped as described with reference to the previous embodiment. In this embodiment, when two straps 14 and 15 are placed within the clamp, and the threaded stud 110 tightened, the cone-shaped tip 107 will penetrate into the strap material from one side, forcing the adjacent strap into the threaded stud recess 115 to ensure a positive mechanical and electrical coupling of one strap to another.

While the invention has been described in the specification and illustrated in the drawings with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments illustrated by the drawings and described in the specification as the best modes presently contemplated for carrying out this invention, but that the invention will include any embodiments falling within the description of the appended claims.

I claim:

1. A clamping device for mechanical and electrical connection to a flat surface, comprising:
   U-shaped clamping means having at least two parallel portions extending outwardly from a common base for positioning therebetween a flat surface which is to be clamped,
   each one of said parallel portions having an inner face surface opposing an inner face surface of the other parallel portion,
   one of said inner face surfaces having a rigidly mounted cone-shaped point extending outwardly therefrom towards an opposing inner face surface,
   threaded stud means carried by one of said parallel portions and extending outwardly therefrom toward said cone-shaped point and positioned coaxially therewith, said threaded stud being made of an electrically conductive material,
   said threaded stud means having a free end formed with a complementary cone-shaped recess, and
   said threaded stud means being rotatable to effect axial movement thereof relative to said cone-shaped point for securing the clamping device to a flat surface positioned therebetween, and
   said threaded stud means includes a head portion having formed therein a bore for receiving a ground wire and a ground wire securing screw for securing the ground wire to said threaded stud means.

2. A clamping device for mechanically and electrically connecting a flat planar surface to a terminated ground wire comprising
   U-shaped clamping means having a pair of parallel portions extending outwardly from a common base for positioning therebetween a flat panel which is to be electrically grounded,
   a first one of said two parallel portions having an inner face which is stepped to facilitate engagement of the clamping means on a flat panel surface,
   said first one of said parallel portions having a bore formed therethrough and a conically-shaped point positioned therein to extend outwardly from the inner surface towards the inner surface of a second one of said parallel portion positioned opposite thereto,
   a threaded stud threadingly engaged in a bore formed in said second one of said parallel portions of said clamping means and positioned coaxial with said cone-shaped point carried by said first one of said parallel portions of said clamping means,
   the end of said threaded stud facing said cone-shaped point being formed with a complementary cone-shaped recess having an outer end serrated, and
   said threaded stud further including a hexagonal-shaped head formed with a ground wire receiving aperture and including a ground wire securing screw for securing a ground wire positioned into said bore to said threaded stud.

3. A clamping device for mechanical and electrical connection to a flat surface, comprising:
   first and second legs extending outwardly from a common base;
   a point rigidly mounted to and extending outwardly from the first leg towards the second leg and having a hardened tip;
   threaded stud means rotatably mounted within a bore in the second leg and extending outwardly towards the first leg and positioned coaxially with the point, the threaded stud means having a free end with an abrading surface surrounding a recess and rotatable to affect axial movement to clamp the flat surface between the hardened tip and the abrading surface to provide intimate electrical contact for grounding purposes, with the point penetrating the flat surface to force a portion of the flat surface into the recess on the threaded stud means to enhance the mechanical clamping of the flat surface.

4. The clamping device of claim 3 wherein the free end of the threaded stud means is formed with a serrated surface for abrading material bearing thereagainst.

5. The clamping device of claim 3 wherein the point is cone-shaped.

6. The clamping device of claim 4 wherein the recess is cone-shaped.

7. The clamping device of claim 3 wherein the point comprises a conically-shaped element secured into an aperture formed through the first leg.

8. The clamping device of claim 3 wherein at least one of the legs includes an undercut portion.

9. The clamping device of claim 3 wherein the threaded stud means includes a head portion having formed therein a bore for receiving a ground wire and a ground wire securing screw for securing the ground wire to said threaded stud means.

* * * * *